(12) United States Patent
Takagi

(10) Patent No.: US 11,134,300 B2
(45) Date of Patent: Sep. 28, 2021

(54) INFORMATION PROCESSING DEVICE

(71) Applicant: SONY SEMICONDUCTOR SOLUTIONS CORPORATION, Kanagawa (JP)

(72) Inventor: Satoshi Takagi, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/643,955

(22) PCT Filed: Jun. 29, 2018

(86) PCT No.: PCT/JP2018/024769
§ 371 (c)(1),
(2) Date: Mar. 3, 2020

(87) PCT Pub. No.: WO2019/054012
PCT Pub. Date: Mar. 21, 2019

(65) Prior Publication Data
US 2021/0006856 A1 Jan. 7, 2021

(30) Foreign Application Priority Data
Sep. 12, 2017 (JP) .............................. JP2017-174833

(51) Int. Cl.
*H04N 21/43* (2011.01)
*G10L 19/008* (2013.01)
(Continued)

(52) U.S. Cl.
CPC ....... *H04N 21/4307* (2013.01); *G10L 19/008* (2013.01); *G10L 21/055* (2013.01); *H04N 5/93* (2013.01); *H04N 21/4346* (2013.01)

(58) Field of Classification Search
CPC .. H04N 21/4307; H04N 5/93; H04N 21/4346; G10L 19/008; G10L 21/055
See application file for complete search history.

(56) References Cited

U.S. PATENT DOCUMENTS

| 5,559,513 A | * | 9/1996 | Rothermel | H03H 17/0657 |
| | | | | 341/61 |
| 2007/0269192 A1 | * | 11/2007 | Sato | H04N 21/23412 |
| | | | | 386/329 |
| 2018/0040348 A1 | | 2/2018 | Hayakawa et al. | |

FOREIGN PATENT DOCUMENTS

| CN | 107409194 A | 11/2017 |
| JP | 2010-210758 A | 9/2010 |

(Continued)

OTHER PUBLICATIONS

International Search Report and Written Opinion of PCT Application No. PCT/JP2018/024769, dated Jul. 31, 2018, 09 pages of ISRWO.

*Primary Examiner* — Michael E Teitelbaum
(74) *Attorney, Agent, or Firm* — Chip Law Group

(57) ABSTRACT

An information processing device including a sound output control unit that performs control related to sound output, in a case where an image captured at a first frame rate is subjected to display reproduction at a second frame rate lower than the first frame rate, on the basis of at least one of an input image signal, an input sound signal, reproduction speed information indicating a ratio between the first frame rate and the second frame rate, or user input information, in which the control related to the sound output performed by the sound output control unit includes switching control that selects one sound output method from a plurality of sound output methods and performs switching, or mixing control that performs mixing of sound signals obtained by the plurality of sound output methods.

13 Claims, 10 Drawing Sheets

(51) Int. Cl.
*G10L 21/055* (2013.01)
*H04N 5/93* (2006.01)
*H04N 21/434* (2011.01)

(56) References Cited

FOREIGN PATENT DOCUMENTS

JP          2016-009961 A      1/2016
WO         2016/139971 A1     9/2016

* cited by examiner

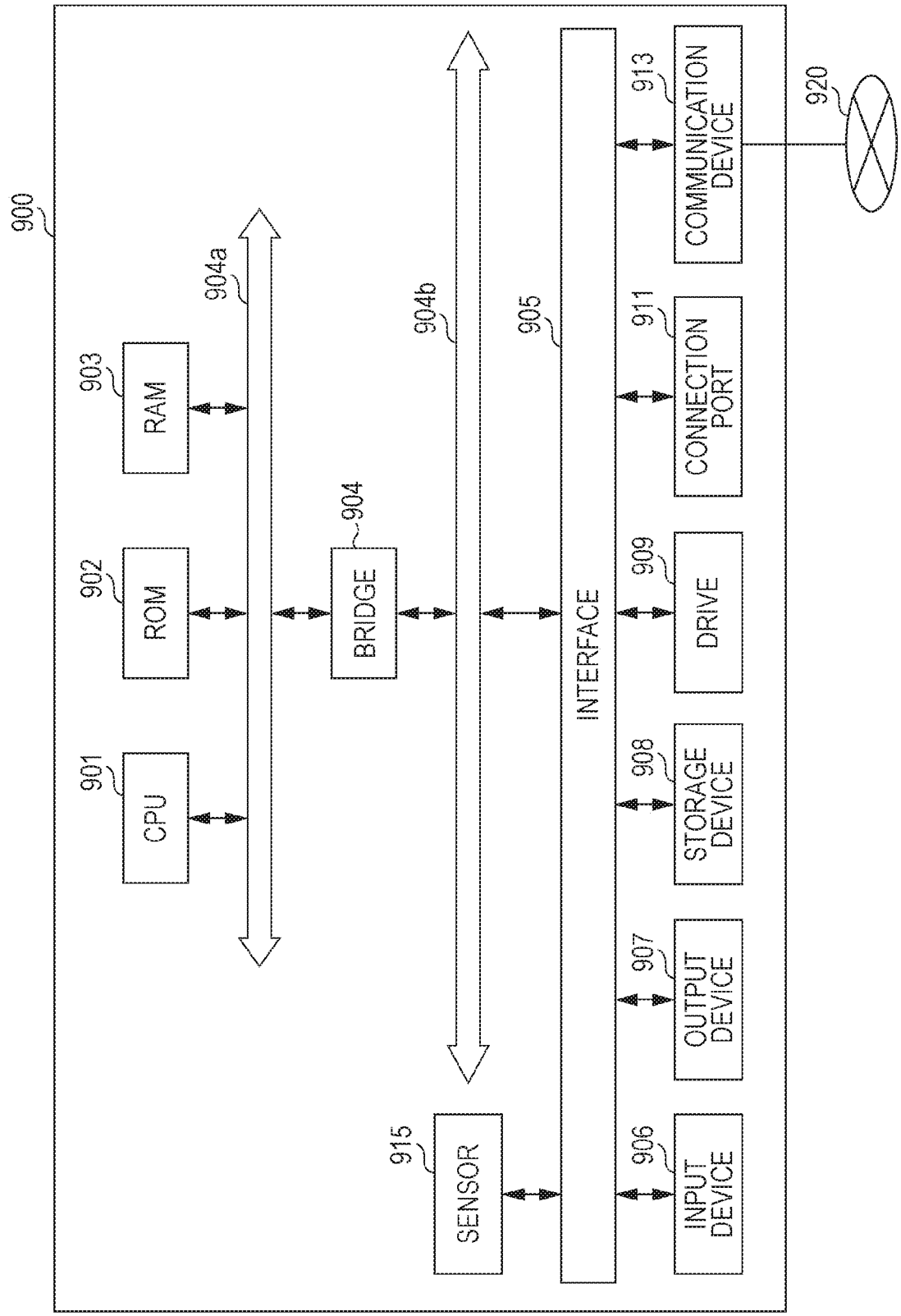

INFORMATION PROCESSING DEVICE

CROSS REFERENCE TO RELATED APPLICATIONS

This application is a U.S. National Phase of International Patent Application No. PCT/JP2018/024769 filed on Jun. 29, 2018, which claims priority benefit of Japanese Patent Application No. JP 2017-174833 filed in the Japan Patent Office on Sep. 12, 2017. Each of the above-referenced applications is hereby incorporated herein by reference in its entirety.

TECHNICAL FIELD

The present disclosure relates to an information processing device and a program.

BACKGROUND ART

Display reproduction has been performed of an image at a frame rate different from a frame rate when the image (video image) is captured. For example, display reproduction is performed of an image captured at a frame rate higher than a frame rate of a general imaging at a frame rate lower than the frame rate at the time of imaging, whereby a smooth slow motion is displayed and the user can grasp movement of a subject in more detail.

In a case where display reproduction is performed at the frame rate different from the frame rate at the time of imaging as described above, it is preferable that sound is output in accordance with the display reproduction of the image, instead of outputting (displaying) only the image. For example, Patent Document 1 discloses a reproduction device that outputs audio while switching audio output methods in a case where such display reproduction is performed.

CITATION LIST

Patent Document

Patent Document 1: Japanese Patent Application Laid-Open No. 2016-9961

SUMMARY OF THE INVENTION

Problems to be Solved by the Invention

In the technology for performing display reproduction at the frame rate lower than the frame rate at the time of imaging as described above, it has been desired to output sound more flexibly.

Solutions to Problems

According to the present disclosure, an information processing device is provided including a sound output control unit that performs control related to sound output, in a case where an image captured at a first frame rate is subjected to display reproduction at a second frame rate lower than the first frame rate, on the basis of at least one of an input image signal, an input sound signal, reproduction speed information indicating a ratio between the first frame rate and the second frame rate, or user input information, in which the control related to the sound output performed by the sound output control unit includes switching control that selects one sound output method from a plurality of sound output methods and performs switching, or mixing control that performs mixing of sound signals obtained by the plurality of sound output methods.

Furthermore, according to the present disclosure, a program is provided causing a computer to implement a function of performing control related to sound output, in a case where an image captured at a first frame rate is subjected to display reproduction at a second frame rate lower than the first frame rate, on the basis of at least one of an input image signal, an input sound signal, reproduction speed information indicating a ratio between the first frame rate and the second frame rate, or user input information, in which the control related to the sound output includes switching control that selects one sound output method from a plurality of sound output methods and performs switching, or mixing control that performs mixing of sound signals obtained by the plurality of sound output methods.

Effects of the Invention

As described above, according to the present disclosure, it is possible to output sound more flexibly in a case where display reproduction is performed at the frame rate lower than the frame rate at the time of imaging.

Note that, the above-described effect is not necessarily restrictive, and, in addition to the above-described effect, or in place of the above-described effect, any of effects described in the present specification, or other effects that can be grasped from the present specification may be exhibited.

BRIEF DESCRIPTION OF DRAWINGS

FIG. 10 is a block diagram illustrating an example of a hardware configuration of the information processing device according to the embodiments of the present disclosure.

MODE FOR CARRYING OUT THE INVENTION

Figure 1:
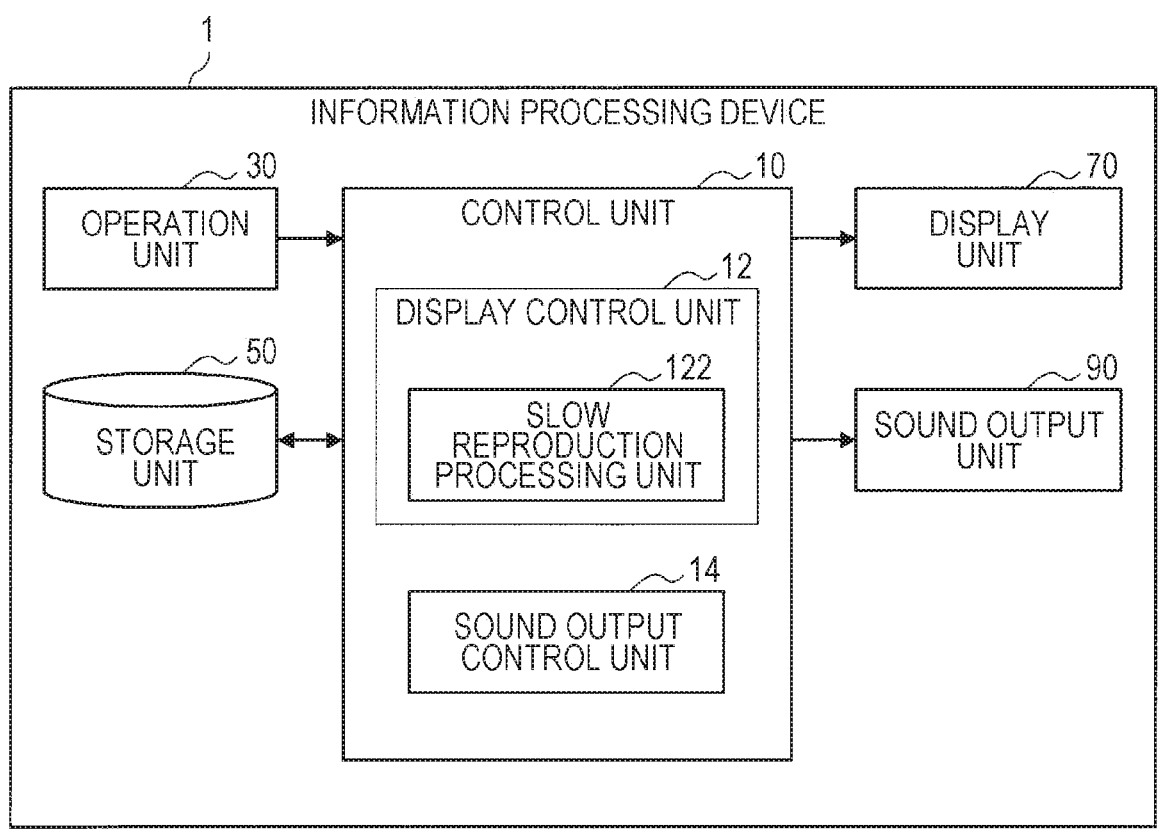
FIG. 1 is an explanatory diagram for describing a configuration example of an information processing device according to a first embodiment of the present disclosure.

Preferred embodiments of the present disclosure will be described in detail below with reference to the accompanying drawings. Note that, in the present specification and the drawings, components having substantially the same functional configuration are denoted by the same reference signs, and redundant explanations will be omitted.

Note that, the description will be given in the following order.
1. Background
2. Embodiments
   2-1. First embodiment
   2-2. Second embodiment
   2-3. Third embodiment
3. Modifications
   3-1. Modification 1
   3-2. Modification 2
4. Hardware configuration example
5. Conclusion

1. Background

In recent years, recording has been realized of an SHFR image (video image) captured at a high frame rate called Super High Frame Rate (Super-HFR, SHFR) exceeding 1000 frames per second (fps). It may be possible to give a user a new experience by performing display reproduction of an image captured at such a high frame rate at a key point at a frame rate lower than the frame rate at the time of imaging (so-called slow reproduction).

In a case where display reproduction is performed at the frame rate different from the frame rate at the time of imaging as described above, it is preferable that sound is output in accordance with the display reproduction of the image, instead of outputting (displaying) only the image. For example, it is conceivable to output sound by using sound acquired at the same time when an image is captured.

However, the frame rate of the image and the sampling rate regarding sound acquisition are usually different from each other, and if it is tried to output sound that matches slow reproduction of the SHFR image as described above, the sound signal at the time of slow reproduction will be constructed from a very small number of samples per time unit. For example, in a case where the frame rate regarding imaging is 1000 fps and the sampling rate regarding sound acquisition is 48 kHz, the number of samples of the sound synchronized per image frame is 48000/1000=48 samples. For example, in a case where slow reproduction is performed at $1/100$ speed, the number of samples corresponding to 1 second in slow reproduction is 480 samples. In a case where a sound signal including such a small number of samples is output to a speaker, sound output from the speaker sounds like a buzzer sound, for example.

Therefore, it is conceivable to obtain an output sound signal corresponding to slow reproduction by performing signal processing on the sound signal. For example, it is conceivable to perform sample interpolation of the sound signal. For example, in the example described above, it is possible to obtain a sound signal of 48000 samples by performing sample interpolation of causing a sound signal of 480 samples to pass through a 1:100 interpolator and a low-pass filter. Note that, the sample interpolation method is not limited to the above-described method using the interpolator and low-pass filter. For example, a method using previous value hold may be used.

However, since the sound signal generated by such sample interpolation is a sound signal in which reproduction time is extended, it results in that the frequency spectrum is uniformly reduced, and, for example, the pitch (pitch of a sound) is lowered. For example, in the case of $1/10$ speed reproduction (in a case where a 1:10 interpolator is used), a 1 kHz sine wave is reproduced as a 100 Hz sine wave. Similarly, in the case of $1/10$ speed reproduction, for example, a human voice of 150 Hz is reproduced at 15 Hz, the pitch of the sound is out of the audible band, the phonemic characteristics are significantly degraded, and it is difficult to understand what is said although it can be determined that the voice is a human voice.

Furthermore, in a case where the reproduction is performed more slowly, for example, in the case of $1/100$ speed reproduction (in a case where a 1:100 interpolator is used), a 1 kHz sine wave is reproduced as a 10 Hz sine wave. Similarly, in the case of $1/100$ speed reproduction, for example, a human voice of 150 Hz is reproduced at 1.5 Hz, the pitch of the sound is out of the audible band, the phonemic characteristics are further significantly degraded, and it is also difficult to determine that the voice is a human voice.

As described above, even if the sample interpolation is performed, the reproduced sound may not be desirable for the user. Thus, at the time of slow reproduction, it is also conceivable to output another sound, for example, a sound prepared in advance, such as a sound effect or a musical piece included in the user's library, instead of the sound acquired at the time of imaging.

However, since an impact sound having impact characteristics such as hitting generated in baseball, golf, or the like includes many high-frequency components, even if the frequency spectrum is uniformly reduced by the sample interpolation described above, it may be possible to provide significant sound in terms of user experience. As described above, in a case where sound output is performed in accordance with slow reproduction of an image, it may not be sufficient to output sound by a single method, and it has been desired to output sound more flexibly.

Thus, each embodiment of the present disclosure has been created by focusing on the above circumstances. In the embodiments of the present disclosure described below, control related to sound output is performed on the basis of at least one of an input image signal, an input sound signal, reproduction speed information, or user input information regarding user input, whereby it is possible to output sound more flexibly. Hereinafter, each embodiment of the present disclosure will be sequentially described in detail with reference to the drawings.

2. Embodiments

2-1. First Embodiment (Device Configuration Example)

FIG. 1 is an explanatory diagram for describing a configuration example of an information processing device according to a first embodiment of the present disclosure. As illustrated in FIG. 1, an information processing device 1 according to the first embodiment of the present disclosure includes a control unit 10, an operation unit 30, a storage unit 50, a display unit 70, and a sound output unit 90. The information processing device 1 according to the present embodiment is an information processing device capable of display reproduction of an image at a frame rate (second frame rate) lower than a frame rate (first frame rate) at the time of imaging.

The control unit 10 functions as an arithmetic processing device and a control device, and controls overall operation in the information processing device 1 in accordance with various programs. Furthermore, the control unit 10 functions as a display control unit 12 and a sound output control unit 14 as illustrated in FIG. 1.

The display control unit 12 performs control related to display by the display unit 70. The display control unit 12 according to the present embodiment includes a slow reproduction processing unit 122 as illustrated in FIG. 1. The slow reproduction processing unit 122 performs processing of performing display reproduction of an image captured at the first frame rate at the second frame rate lower than the first frame rate (slow reproduction).

Note that, data (input image signal) related to the image captured at the first frame rate may be provided from the storage unit 50 to the display control unit 12, or may be received from another device via a communication unit (not illustrated). Furthermore, the second frame rate may be specified by user input via the operation unit 30 or may be specified on the basis of a setting stored in the storage unit 50.

The sound output control unit 14 performs control related to sound output by the sound output unit 90. A detailed configuration of the sound output control unit 14 will be described later with reference to FIG. 2, but the sound output control unit 14 according to the present embodiment performs control related to sound output on the basis of the user input information.

The operation unit 30 accepts user input. As will be described later, the operation unit 30 according to the present embodiment accepts user input related to selection of a sound output method, and provides the user input to the control unit 10 as the user input information. Note that, the user input information is not limited to the example provided directly from the operation unit 30 to the control unit 10, and user input information input by the user via the operation unit 30 in advance may be stored in the storage unit 50, and provided from the storage unit 50 to the control unit 10. Furthermore, the operation unit 30 may be implemented by, for example, a mouse, a keyboard, a touch panel, a button, a switch, a lever, a dial, or the like.

The storage unit 50 stores programs and parameters for the control unit 10 to execute each function. For example, the storage unit 50 stores the data (input image signal) related to the image captured at the first frame rate, and data related to sound (input sound signal) acquired when the image is captured. Furthermore, the storage unit 50 may store a sound signal prepared in advance to be provided to the sound output control unit 14 as described later. The sound signal prepared in advance may include, for example, a preset sound effect (generated sound and the like), or a sound signal related to a user-defined sound, musical sound, or the like included in the user's library, or may include a silence signal.

The display unit 70 displays an image in accordance with the control of the display control unit 12. For example, as described above, the display unit 70 performs display reproduction at the frame rate (second frame rate) lower than the frame rate (first frame rate) at the time of imaging.

The sound output unit 90 is controlled by the sound output control unit 14, and outputs, for example, an output sound signal output from the sound output control unit 14 as sound.

In the above, the configuration example has been described of the information processing device 1 according to the present embodiment. Note that, the configuration illustrated in FIG. 1 is an example, and is not limited to such an example. For example, FIG. 1 illustrates a configuration in which the information processing device 1 includes the display unit 70 and the sound output unit 90; however, the information processing device 1 does not have to include the display unit and the sound output unit. For example, the display control unit 12 may control display of an external display unit, or the sound output control unit 14 may control sound output of an external sound output unit (output a sound signal to the external sound output unit). Furthermore, the function of the storage unit 50 may exist outside the information processing device 1.

(Configuration example of sound output control unit)

Figure 2:
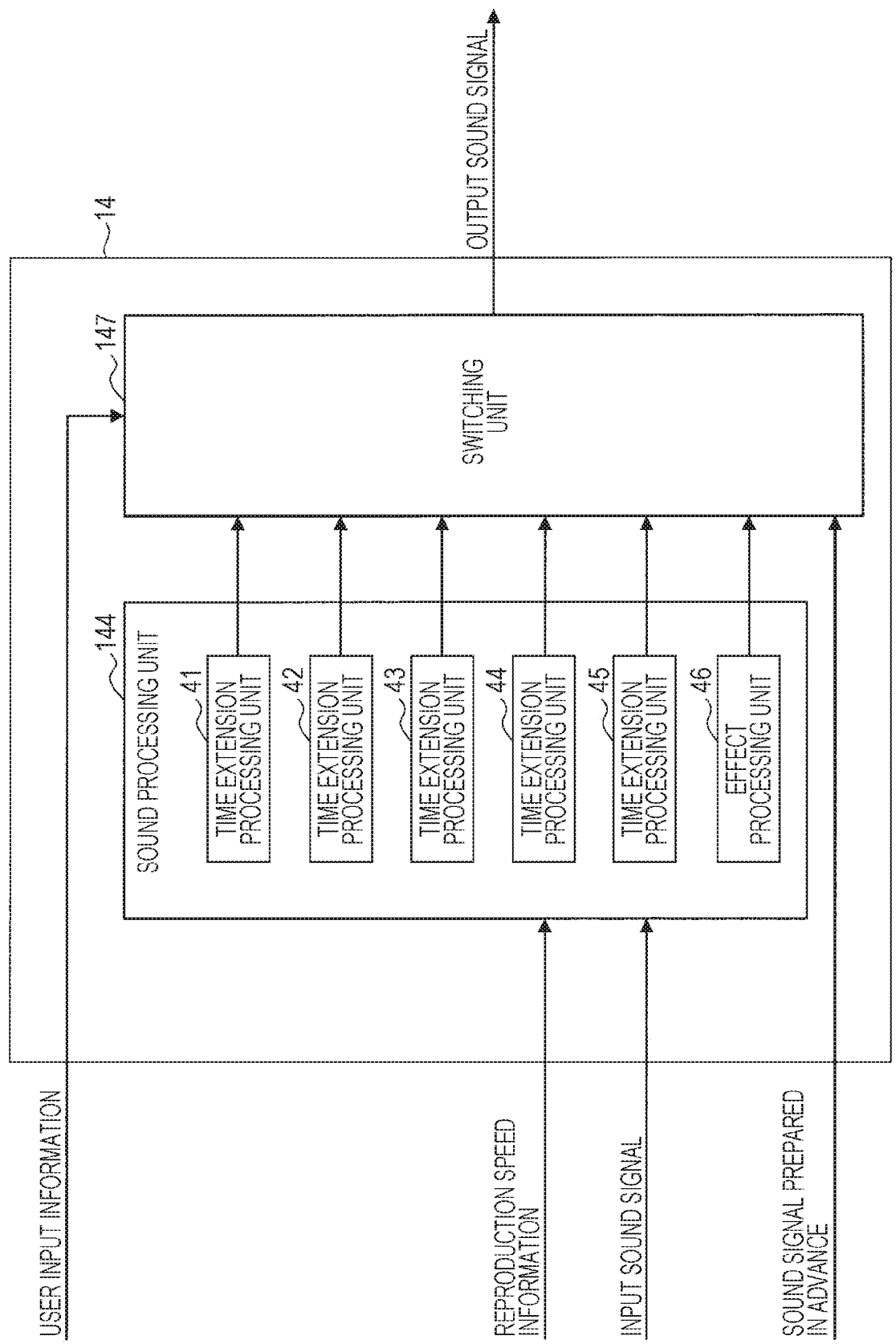
FIG. 2 is a block diagram illustrating a configuration example of a sound output control unit 14 according to the embodiment.

Subsequently, with reference to FIG. 2, a more detailed configuration will be described of the sound output control unit 14 illustrated in FIG. 1. FIG. 2 is a block diagram illustrating a configuration example of the sound output control unit 14 according to the present embodiment. As illustrated in FIG. 2, the sound output control unit 14 includes a sound processing unit 144 and a switching unit 147.

The sound processing unit 144 performs sound signal processing on the input sound signal on the basis of reproduction speed information indicating a ratio between the first frame rate and the second frame rate, and outputs to the switching unit 147 a sound signal on which the sound signal is performed. For example, as illustrated in FIG. 2, the sound processing unit 144 has functions as time extension processing units 41 to 45 and an effect processing unit 46.

The time extension processing units 41 to 45 perform time extension processing of extending the input sound signal on the basis of the reproduction speed information. Furthermore, the time extension processing units 41 to 45 perform respective different types of time extension processing on the same input sound signal, and output obtained time extension sound signals to the switching unit 147. Note that, the method in which the sound output control unit 14 outputs a time extension sound signal by any of the time extension processing units 41 to 45 as an output sound signal to the sound output unit 90 described with reference to FIG. 1, may be referred to as a time extension method.

The time extension processing unit 41 performs time extension processing by the sample interpolation described above. The sample interpolation by the time extension processing unit 41 can be performed by various methods, for example, a method using an interpolator and a low-pass filter, a method of applying a low-pass filter after zero insertion, a method using a previous value hold, a method of interpolating with a Lagrangian polynomial or a spline polynomial, and the like.

When the time extension processing by the sample interpolation is performed, the pitch is converted and the pitch of the sound is lowered as described above. Therefore, the time extension processing by the sample interpolation is effective in a case where a high-frequency component is included, for example, an impact sound having impact characteristics such as hitting. Furthermore, in a case where the reproduction speed is not too low (the pitch of the sound does not drop too much), the time extension processing by the sample interpolation is also effective for a human voice, a musical piece, and noise in which the pitch of the sound can be felt.

The time extension processing unit 42 performs time extension processing by inserting silence time between sounds. Such time extension processing by insertion of silence time is effective, for example, in a scene of a human voice in a case where there is no BGM. Note that, the time extension processing unit 42 may also use the time extension processing by the sample interpolation described above. Furthermore, the time extension processing unit 42 may perform phase management in consideration of synchronization with display reproduction. Since a well-known technique can be applied to such phase management, a detailed description thereof will be omitted here.

The time extension processing unit 43 performs time extension processing of repeating a waveform included in the input sound signal at a predetermined period. For example, the time extension processing unit 43 may repeat the waveform in units synchronized with the fundamental frequency of the input sound signal, or a human voice. Such time extension processing is effective in a scene having a relatively large number of sounds, but there is a possibility that an annoying beat sound may be generated in some cases. To reduce the generation of the beat sound, the time extension processing unit 43 may prepare a large number of sound samples before and after waveform repetition and perform the repetition while cross-fading, or determine the consonants and vowels of the human voice included in the sound and change the number of repetitions depending on the determination result.

Figure 3:
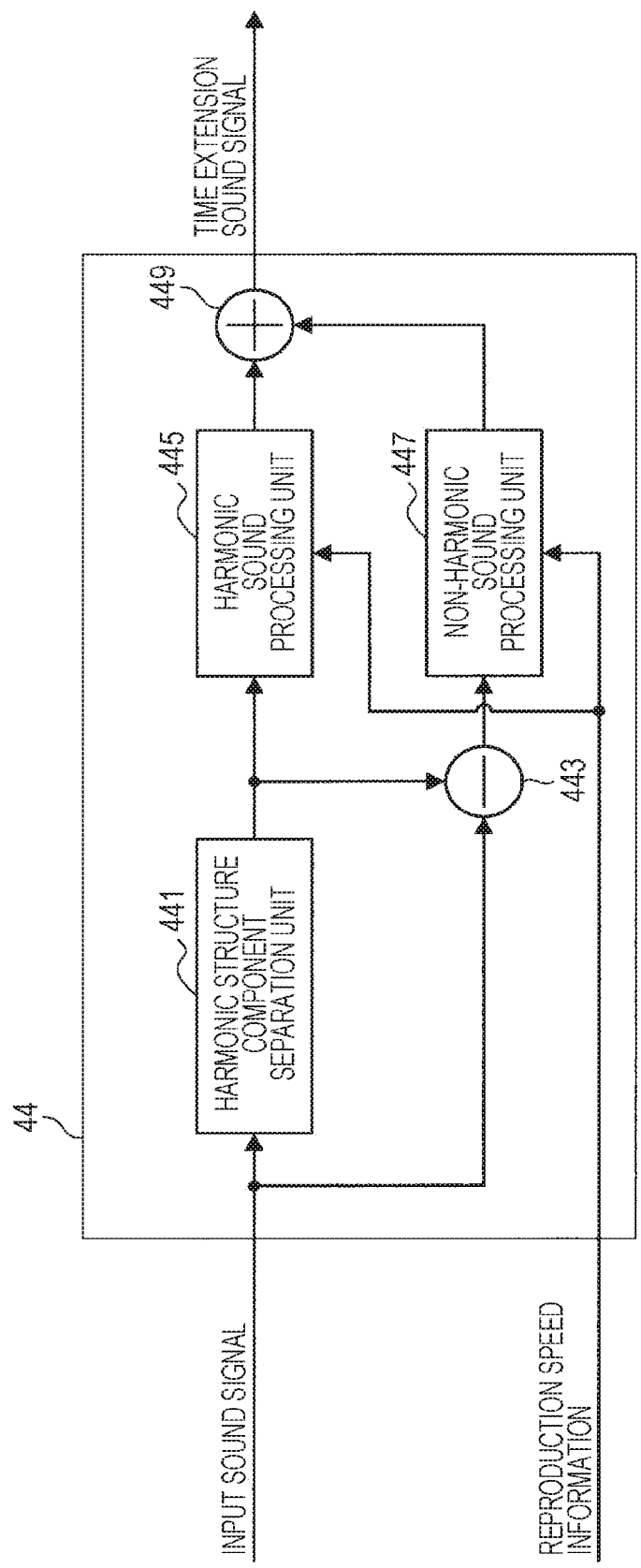
FIG. 3 is an explanatory diagram illustrating a configuration example of a time extension processing unit 44.

The time extension processing unit 44 separates the input sound signal into a sound signal related to the harmonic sound and a sound signal related to the non-harmonic sound on the basis of the harmonic structure, and performs different types of time extension processing respectively for the sound signal related to the harmonic sound and the sound signal related to the non-harmonic sound. The time extension processing unit 44 will be described in more detail with reference to FIG. 3. FIG. 3 is an explanatory diagram illustrating a configuration example of the time extension processing unit 44. As illustrated in FIG. 3, the time extension processing unit 44 includes a harmonic structure component separation unit 441, a subtraction unit 443, a harmonic sound processing unit 445, a non-harmonic sound processing unit 447, and an addition unit 449.

A general musical piece includes a non-harmonic sound by a percussion instrument or the like, and a harmonic sound by a human voice, wind and string instruments, or the like. The harmonic structure component separation unit 441 separates a sound signal related to such harmonic sound from the input sound signal on the basis of the harmonic structure, and outputs the sound signal to the subtraction unit 443 and the harmonic sound processing unit 445.

The subtraction unit 443 subtracts (reduces) the sound signal related to the harmonic sound from the input sound signal to obtain the sound signal related to the non-harmonic sound. Furthermore, the subtraction unit 443 outputs the sound signal related to the non-harmonic sound to the non-harmonic sound processing unit 447.

The harmonic sound processing unit 445 performs time extension processing on the sound signal related to the harmonic sound input from the harmonic structure component separation unit 441, and outputs the signal to the addition unit 449. The harmonic sound processing unit 445 may perform, on the sound signal related to the harmonic sound, time extension processing by repeating the waveform in, for example, a relatively long time unit (for example, several tens to several hundreds msec). Since the harmonic sound has a frequency spectrum structure constant over a certain time, the degradation is small even when the time extension processing by repeating the waveform is performed as described above.

The non-harmonic sound processing unit 447 performs time extension processing on the sound signal related to the non-harmonic sound input from the subtraction unit 443, and outputs the signal to the addition unit 449. The non-harmonic sound processing unit 447 performs, on the sound signal related to the non-harmonic sound, time extension processing different from the above-described time extension processing performed by the harmonic sound processing unit 445 on the sound signal related to the harmonic sound. For example, the non-harmonic sound processing unit 447 may perform the above-described time extension processing by the sample interpolation on the sound signal related to the harmonic sound. Alternatively, the non-harmonic sound processing unit 447 may perform, on the sound signal related to the harmonic sound, time extension processing by repeating the waveform in a time unit shorter than the time unit of repetition in the time extension processing by the harmonic sound processing unit 445. Since the non-harmonic sound has impact characteristics, the sound has high whiteness, and even when such time extension processing by the sample interpolation or time extension processing by repetition in a short time unit is performed, the degradation is small.

The addition unit 449 outputs a sound signal obtained by adding (mixing) the output signal of the harmonic sound processing unit 445 and the output signal of the non-harmonic sound processing unit 447 together to the switching unit 147, as a time extension sound signal.

As described above, by performing different types of time extension processing respectively on the sound signal related to the harmonic sound and the sound signal related to the non-harmonic sound, for example, more appropriate time extension processing can be performed in a scene where there is BGM, such as a dance in an athletic meet.

Similarly to the time extension processing unit 44, the time extension processing unit 45 performs different types of time extension processing respectively on the sound signal related to the harmonic sound and the sound signal related to the non-harmonic sound. However, the time extension processing unit 45 separates an ambient noise signal related to ambient noise (ambient) before performing the separation based on the harmonic structure, and performs time extension processing similar to that of the time extension processing unit 44 on a noise reduction signal in which such an ambient noise signal is reduced.

Figure 4:
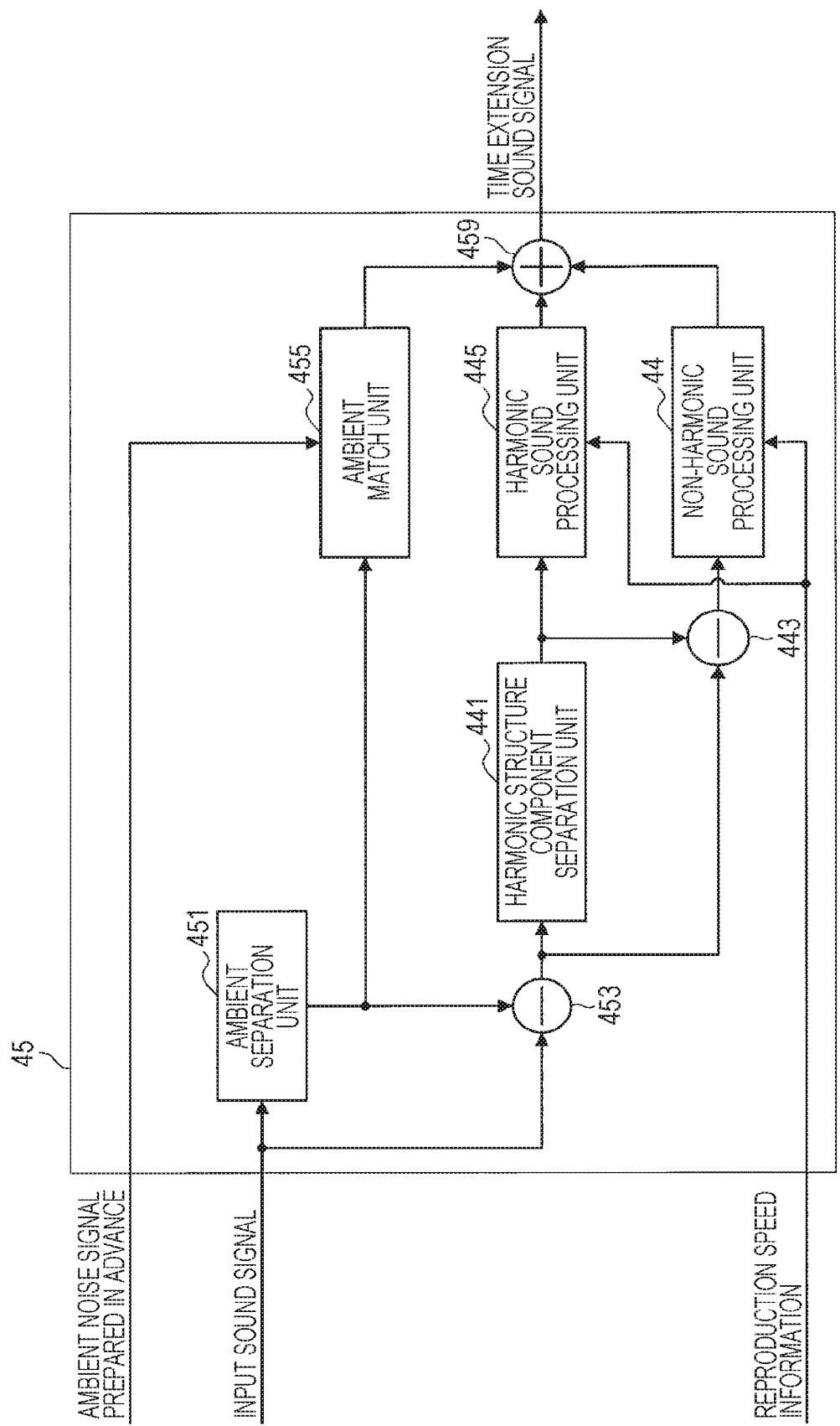
FIG. 4 is an explanatory diagram illustrating a configuration example of a time extension processing unit 45.

The time extension processing unit 45 will be described in more detail with reference to FIG. 4. FIG. 4 is an explanatory diagram illustrating a configuration example of the time extension processing unit 45. As illustrated in FIG. 4, the time extension processing unit 45 includes the harmonic structure component separation unit 441, the subtraction unit 443, the harmonic sound processing unit 445, the non-harmonic sound processing unit 447, an ambient separation unit 451, a subtraction unit 453, an ambient match unit 455, and an addition unit 459. Note that, among the components illustrated in FIG. 4, the components substantially similar to the components illustrated in FIG. 3 are denoted by the same reference numerals, so that descriptions thereof will be omitted.

The ambient separation unit 451 separates the ambient noise signal related to the ambient noise from the input sound signal, and outputs the signal to the subtraction unit 453 and the ambient match unit 455. Note that, the ambient noise is noise from which the ambience of the field can be known, for example, sound of waves, sound of wind, or the like.

The subtraction unit 443 subtracts (reduces) the ambient noise signal from the input sound signal to obtain the noise reduction signal. Furthermore, the subtraction unit 453 outputs the noise reduction signal to the harmonic structure component separation unit 441. With such a configuration, separation performance by the harmonic structure component separation unit 441 is improved, and the time extension processing can be more appropriately performed on the sound signal related to the harmonic sound and the sound signal related to the non-harmonic sound.

The ambient match unit 455 selects a sound signal similar to the ambient noise signal input from the ambient separation unit 451 from a plurality of ambient noise signals prepared in advance on the basis of the ambient noise signal input from the ambient separation unit 451, and outputs the signal to the addition unit 459. Note that, the plurality of ambient noise signals prepared in advance may be stored in the storage unit 50 illustrated in FIG. 1, for example.

The addition unit 459 outputs, to the switching unit 147, as a time extension sound signal, a sound signal obtained by adding (mixing) the sound signal output from the ambient match unit 455 to the sound signal on which the time extension processing by the harmonic sound processing unit 445 and the non-harmonic sound processing unit 447 is performed.

With the configuration described above, for example, in a scene that includes ambient noise, it is possible to maintain the ambience of the sound output before and after switching between display reproduction at normal speed (1× speed) and display reproduction at the second frame rate.

Note that, in the above description, an example has been described in which the sound signal output from the ambient match unit 455 is added (mixed) to the sound signal on which the time extension processing is performed; however, the present technology is not limited to such an example. For example, instead of the sound signal output from the ambient match unit 455, an ambient signal output from the ambient separation unit 451 may be added (mixed) to the sound signal on which the time extension processing is performed.

Referring back to FIG. 2, the description will be continued. The effect processing unit 46 illustrated in FIG. 2 outputs to the switching unit 147 an effect sound signal obtained by performing predetermined effect processing on a sound signal based on the input sound signal. The effect processing performed by the effect processing unit 46 may include, for example, reverse pre-echo, post delay, or a combination thereof. Such effect processing is effective for impact sound having impact characteristics, for example, hitting or the like.

The sound signal based on such an input sound signal may be, for example, the input sound signal itself, or may be a sound signal obtained by performing the time extension processing by the sample interpolation on the input sound signal. Such sample interpolation may be sample interpolation corresponding to a frame rate between the first frame rate and the second frame rate. Note that, the effect processing unit 46 may perform phase management in consideration of synchronization with display reproduction, similarly to the time extension processing unit 42.

In the above, an example has been described of sound signal processing by the sound processing unit 144. Note that, the above-described sound signal processing by the sound processing unit 144 is an example, and the sound processing unit 144 may perform another type of sound signal processing. For example, the sound processing unit 144 may include a processing block that performs sound processing in which a plurality of types of sound signal processing described above is combined, and such an example will be described later as a modification.

The switching unit 147 performs switching control that selects one sound output method from a plurality of sound output methods and performs switching. For example, the switching unit 147 selects one output sound signal from a plurality of sound signals, and outputs the one output sound signal to the sound output unit 90.

The plurality of sound output methods includes, for example, a time extension method of outputting to the sound output unit 90 the time extension sound signal obtained by the time extension processing units 41 to 45 described above. Note that, since the time extension processing units 41 to 45 perform respective different types of time extension processing, the plurality of sound output methods is considered to include a plurality of time extension methods in this specification.

Furthermore, the plurality of sound output methods includes, for example, a method of outputting to the sound output unit 90 the effect sound signal obtained by the effect processing unit 46 described above.

Moreover, the plurality of sound output methods may include a method of outputting a sound signal prepared in advance to the sound output unit 90. The sound signal prepared in advance may include, for example, a preset sound effect (generated sound and the like), or a sound signal related to a user-defined sound, musical sound, or the like included in the user's library, or may include a silence signal. Note that, in this specification, such sound output methods are regarded as different sound output methods for respective sound signals prepared in advance. Sound output by outputting such a sound signal prepared in advance to the sound output unit 90 can provide the user with an effective slow motion experience regardless of the scene.

Furthermore, the switching unit 147 according to the present embodiment performs switching control on the basis of user input information. For example, the switching unit 147 according to the present embodiment performs switching control to select a sound output method selected by the user from the plurality of sound output methods described above.

(Operation example)

Figure 5:
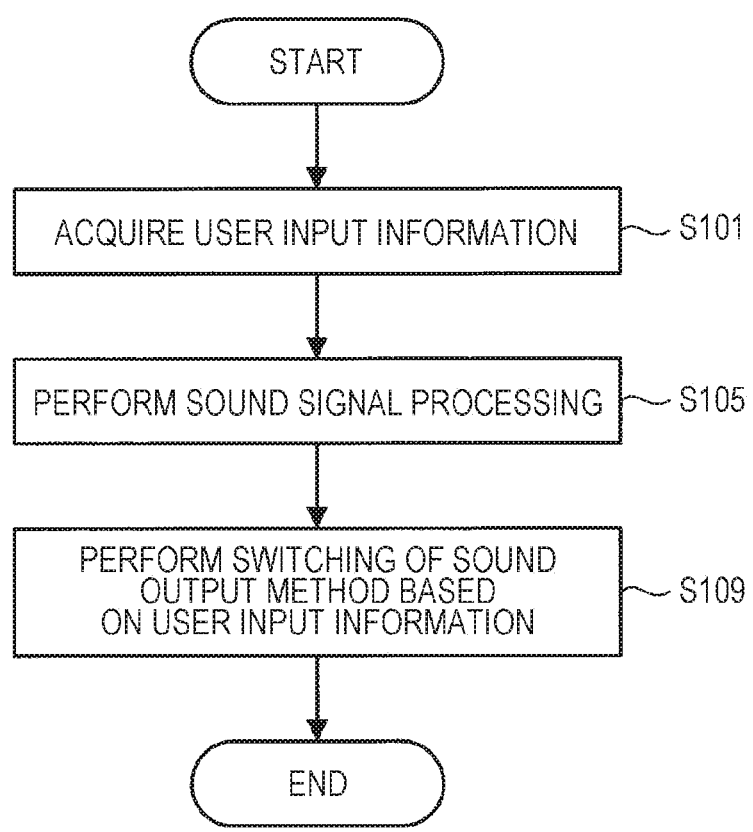
FIG. 5 is a flowchart illustrating an operation example according to the present embodiment.

In the above, descriptions have been given of the configuration example of the information processing device 1 according to the first embodiment of the present disclosure, and the configuration example of the sound output control unit 14 included in the information processing device 1. Subsequently, an operation example according to the present embodiment will be described. FIG. 5 is a flowchart illustrating the operation example according to the present embodiment. Note that, FIG. 5 illustrates only operation related to the sound output control unit 14 in operation of the information processing device 1 according to the present embodiment.

As illustrated in FIG. 5, first, user input information is acquired (S101). Note that, the processing of step SS101 may be processing performed in response to accepting a user input via the operation unit 30, or may be processing in which user input information based on a setting input performed in advance by the user is provided to the sound output control unit 14.

Furthermore, the sound processing unit 144 performs sound signal processing on an input sound signal (S105). Note that the sound signal processing in step S105 may be performed in parallel by each processing block included in the sound processing unit 144, for example. Furthermore, the order of the processing in step S101 and step S105 may be reversed.

Subsequently, the switching unit 147 performs switching control of the sound output method on the basis of the user input information (S109). Note that, the processing of steps S101 to S109 described above may be repeated as appropriate.

(Effect)

In the above, the first embodiment of the present disclosure has been described. According to the present embodiment, the switching control is performed to select the sound output method selected by the user. As described above, since the effective sound output method differs depending on the scene, the user can select the sound output method depending on the scene. Furthermore, it is conceivable that preferences vary depending on users, but by selecting the sound output method by the user oneself as in the present embodiment, sound can be output by the sound output method more suitable for the user's preference.

2-2. Second Embodiment

In the first embodiment described above, the switching control of the sound output method is performed on the basis of the user input. Subsequently, in the following, as a second embodiment of the present disclosure, an example will be described in which the switching control of the sound output method is automatically performed without requiring user input. Note that, a configuration of an information processing device according to the present embodiment is substantially similar to the configuration of the information processing device 1 according to the first embodiment illustrated in FIG. 1 except that a functional configuration of a sound output control unit is different. Thus, in the following, description will be omitted of the configuration similar to that of the first embodiment, and a configuration will be described of the sound output control unit provided in the information processing device according to the present embodiment with reference to FIG. 6.

(Configuration example of sound output control unit)

Figure 6:
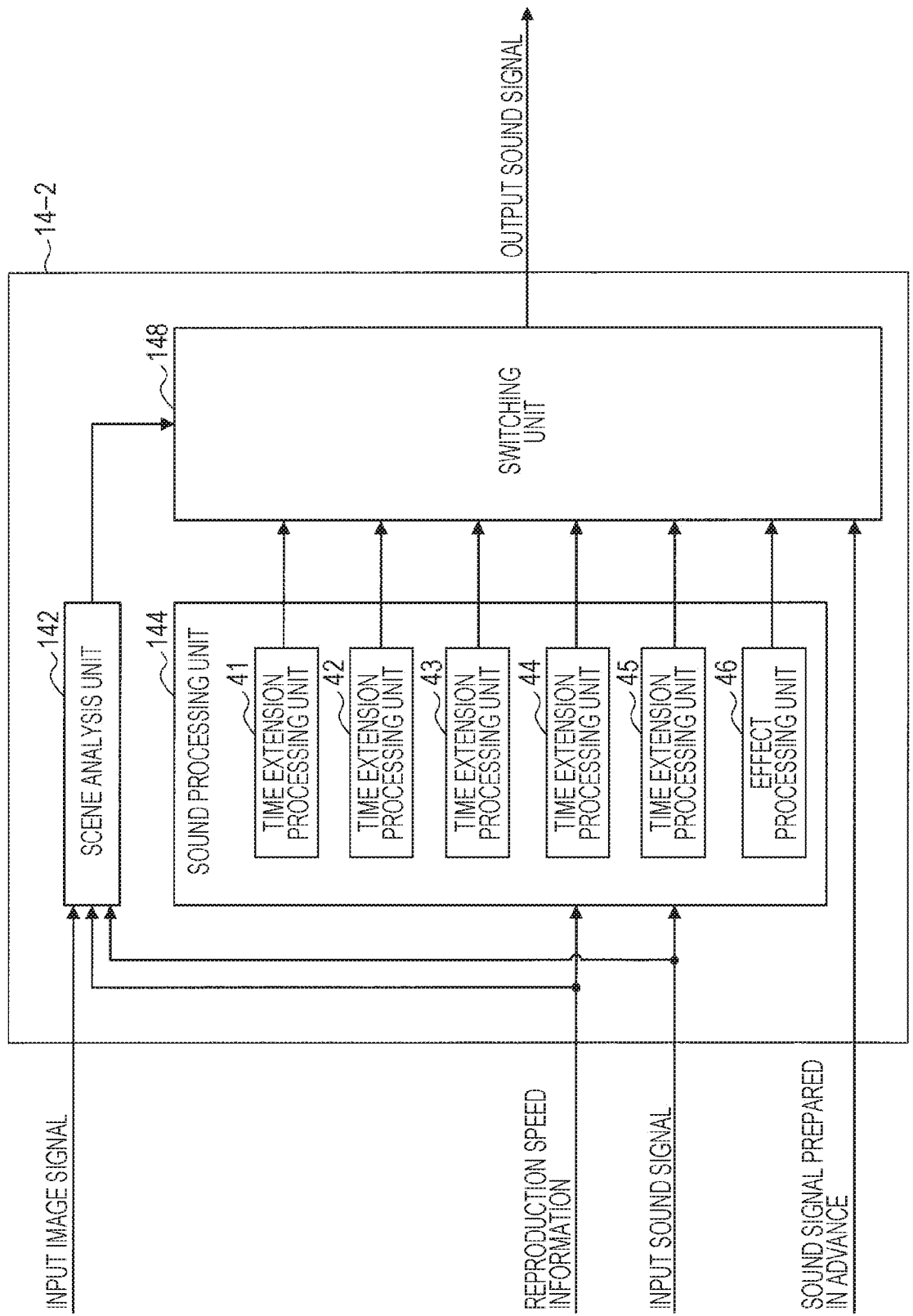
FIG. 6 is a block diagram illustrating a configuration of a sound output control unit 14-2 included in an information processing device according to a second embodiment of the present disclosure.

FIG. 6 is a block diagram illustrating a configuration of a sound output control unit 14-2 included in the information processing device according to the second embodiment of the present disclosure. As illustrated in FIG. 6, the sound output control unit 14-2 includes a scene analysis unit 142, the sound processing unit 144, and a switching unit 148. Note that, a functional configuration of the sound processing unit 144 illustrated in FIG. 6 is substantially similar to the functional configuration of the sound processing unit 144 described with reference to FIGS. 2 to 4, so that description thereof will be omitted here.

The scene analysis unit 142 performs scene analysis on the basis of an input image signal, an input sound signal, and reproduction speed information. Furthermore, the scene analysis unit 142 selects an output sound method on the basis of the result of the scene analysis.

For the scene analysis by the scene analysis unit 142, a known scene analysis method may be used for analyzing a scene related to an image or sound from data including the image or sound. For example, the scene analysis by the scene analysis unit 142 may include human voice detection that detects a human voice from the input sound signal, face detection that detects a human face from the input image signal, and the like. Furthermore, the scene analysis unit 142 may perform selection of an output sound method based on the result of the scene analysis so that an appropriate sound output method is selected in a scene in which each sound output method described in the first embodiment is effective.

Similarly to the switching unit 147 according to the first embodiment, the switching unit 148 performs switching control that selects one sound output method from a plurality of sound output methods and performs switching. However, the switching unit 148 according to the present embodiment is different from the switching unit 147 according to the first embodiment in that switching is performed to the sound output method selected by the scene analysis unit 142.

(Operation example)

Figure 7:
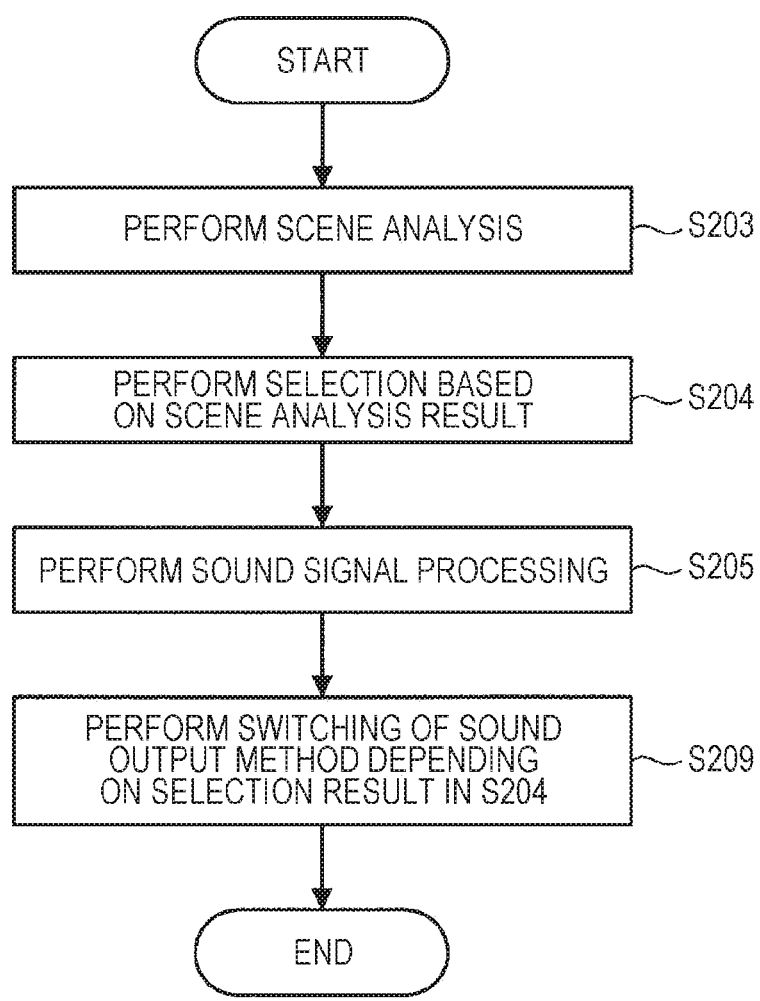
FIG. 7 is a flowchart illustrating an operation example of the sound output control unit 14-2 according to the embodiment.

In the above, a configuration example has been described of the sound output control unit 14-2 according to the present embodiment. Subsequently, an operation example according to the present embodiment will be described. FIG. 7 is a flowchart illustrating an operation example of the sound output control unit 14-2 according to the present embodiment.

As illustrated in FIG. 7, first, the scene analysis unit 142 performs scene analysis on the basis of the input image signal, the input sound signal, and the reproduction speed information (S203). Subsequently, the scene analysis unit 142 selects an output sound method on the basis of the result of the scene analysis (S204).

Furthermore, the sound processing unit 144 performs sound signal processing on the input sound signal (S205). Subsequently, the switching unit 148 performs switching control of the output sound signal on the basis of the selection result in step S204 (S209). Note that, the processing of steps S201 to S209 described above may be repeated as appropriate.

(Effect)

In the above, the second embodiment of the present disclosure has been described. According to the present embodiment, the switching control is performed that performs switching to the sound output method selected automatically on the basis of the result of the scene analysis. With such a configuration, for example, the user's input operation becomes unnecessary, and the user's burden is reduced. Furthermore, since an effective sound output method is automatically selected depending on the scene, an appropriate sound output can be performed even if the user does not grasp a scene in which each sound output method is effective.

2-3. Third Embodiment

In the second embodiment described above, the switching control of the sound output method is automatically performed on the basis of the result of the scene analysis. By the way, it can be said that the result (parameter) of the scene analysis and the selection of the sound output method are discrimination problems. Thus, the selection of the output sound method based on the result of the scene analysis described above can also be performed by using a discriminator obtained by machine learning. In such a case, it is desirable to learn a large number of teacher data to obtain a discriminator capable of discrimination with high accuracy.

Thus, in the following, as a third embodiment of the present disclosure, an example will be described in which switching control is performed on the basis of user input information, and learning is performed by associating the result of the scene analysis with the user input information to obtain a discriminator. Note that, a configuration of an information processing device according to the present embodiment is substantially similar to the configuration of the information processing device 1 according to the first embodiment illustrated in FIG. 1 except that a functional configuration of a sound output control unit is different. Thus, in the following, description will be omitted of the configuration similar to that of the first embodiment, and a configuration will be described of the sound output control unit provided in the information processing device according to the present embodiment with reference to FIG. 8.

(Configuration example of sound output control unit)

Figure 8:
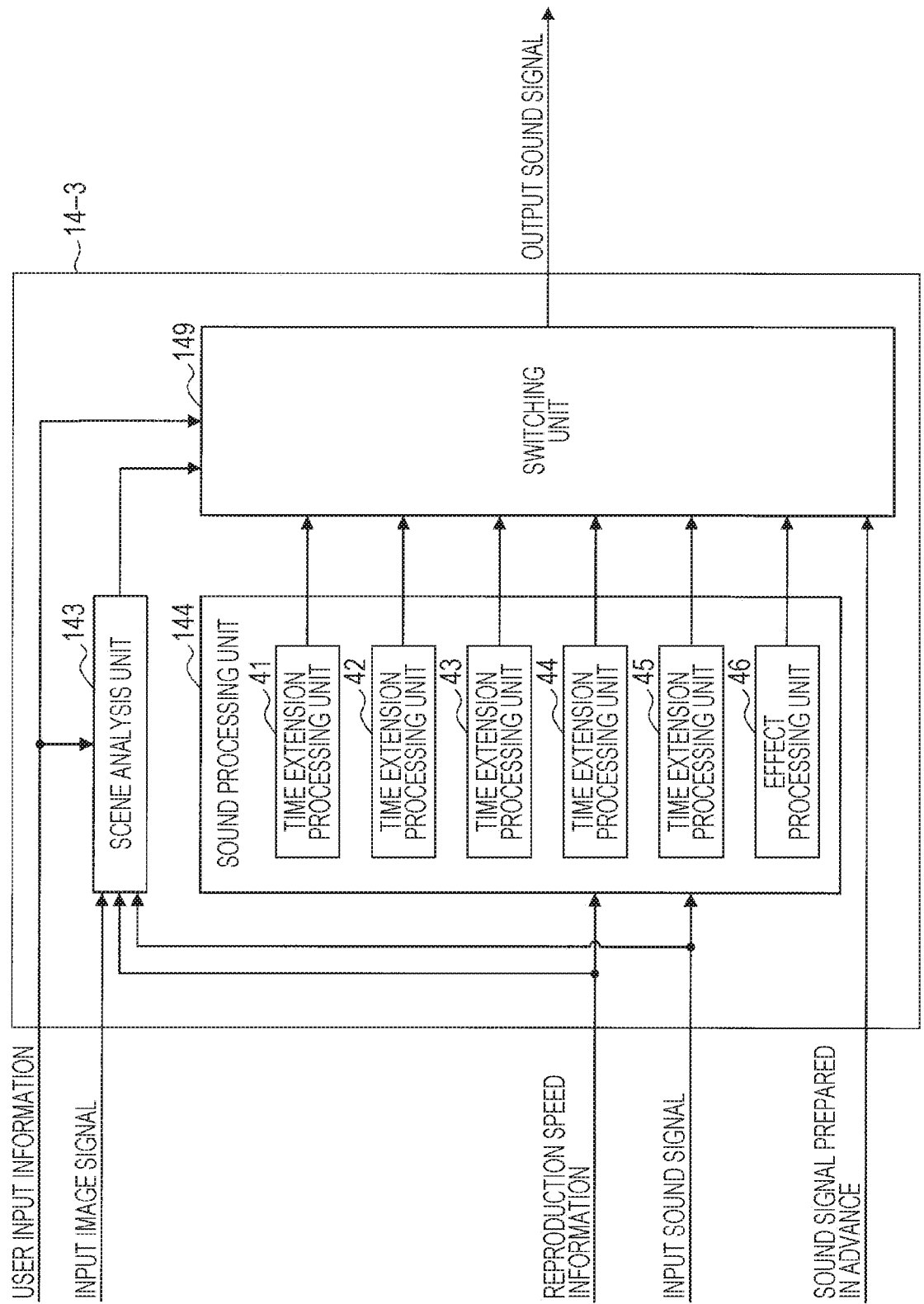
FIG. 8 is a block diagram illustrating a configuration of a sound output control unit 14-3 included in an information processing device according to a third embodiment of the present disclosure.

FIG. 8 is a block diagram illustrating a configuration of a sound output control unit 14-3 included in the information processing device according to the third embodiment of the present disclosure. As illustrated in FIG. 8, the sound output control unit 14-3 includes a scene analysis unit 143, the sound processing unit 144, and a switching unit 149. Note that, a functional configuration of the sound processing unit 144 illustrated in FIG. 8 is substantially similar to the functional configuration of the sound processing unit 144 described with reference to FIGS. 2 to 4, so that description thereof will be omitted here.

Similarly to the scene analysis unit 142 according to the second embodiment described with reference to FIG. 6, the scene analysis unit 143 performs scene analysis on the basis of an input image signal, an input sound signal, and reproduction speed information. However, the scene analysis unit 143 according to the present embodiment performs learning with data in which the result of the scene analysis and user input information are associated with each other, as teacher data (correct answer data), to obtain a discriminator. Note that, here, the user input information is information related to the selection of the sound output method by the user, and the scene analysis unit 143 performs learning with the data in which the result of the scene analysis and the sound output method selected by the user are associated with each other, as the teacher data (correct answer data). Furthermore, the discriminator obtained by learning may be stored in the storage unit 50.

Note that, in a case where the information processing device according to the present embodiment is used by a plurality of users, the scene analysis unit 143 may perform learning for each user and generate a discriminator for each user. With such a configuration, it is possible to reflect the user's preference in the discriminator.

Furthermore, the scene analysis unit 143 according to the present embodiment may select an output sound method on the basis of the result of the scene analysis using the discriminator obtained by learning.

The switching unit 149 performs switching control that selects one sound output method from a plurality of sound output methods and performs switching. The switching unit 149 according to the present embodiment may perform switching control on the basis of the user input information like the switching unit 147 according to the first embodiment, or may perform switching control that performs switching to the sound output method selected by the scene analysis unit 143 like the switching unit 148 according to the second embodiment.

For example, in a case where the learning performed by the scene analysis unit 143 is insufficient, the switching unit 149 according to the present embodiment may perform the switching control on the basis of the user input information. Furthermore, in a case where sufficient learning has already been performed by the scene analysis unit 143, the switching unit 149 according to the present embodiment may perform the switching control that performs switching to the sound output method selected by the scene analysis unit 143.

Note that, whether or not sufficient learning has been performed by the scene analysis unit 143 may be determined on the basis of the amount of teacher data learned by the scene analysis unit 143, for example. Alternatively, whether or not sufficient learning has been performed may be determined on the basis of a matching rate (correct answer rate) between the output sound method selected by the scene analysis unit 143 by using the current discriminator and the output sound method selected by the user. Furthermore, the component for performing such determination is not particularly limited, and may be, for example, the scene analysis unit 143 or the switching unit 149.

Note that, in a case where it is determined that sufficient learning has been performed by the scene analysis unit 143, the user may be notified of information indicating that sufficient learning has been performed by the scene analysis unit 143, or that the user's input operation is no longer necessary. Such notification may be performed by display on the display unit 70 or sound output by the sound output unit 90, or may be performed by other methods. With such a configuration, the user can grasp that the sound output method is automatically switched without performing input operation. Note that, even after the user is notified in this way, in a case where input operation is performed by the user, the scene analysis unit 143 may perform switching control on the basis of the user input information.

(Operation example)

Figure 9:
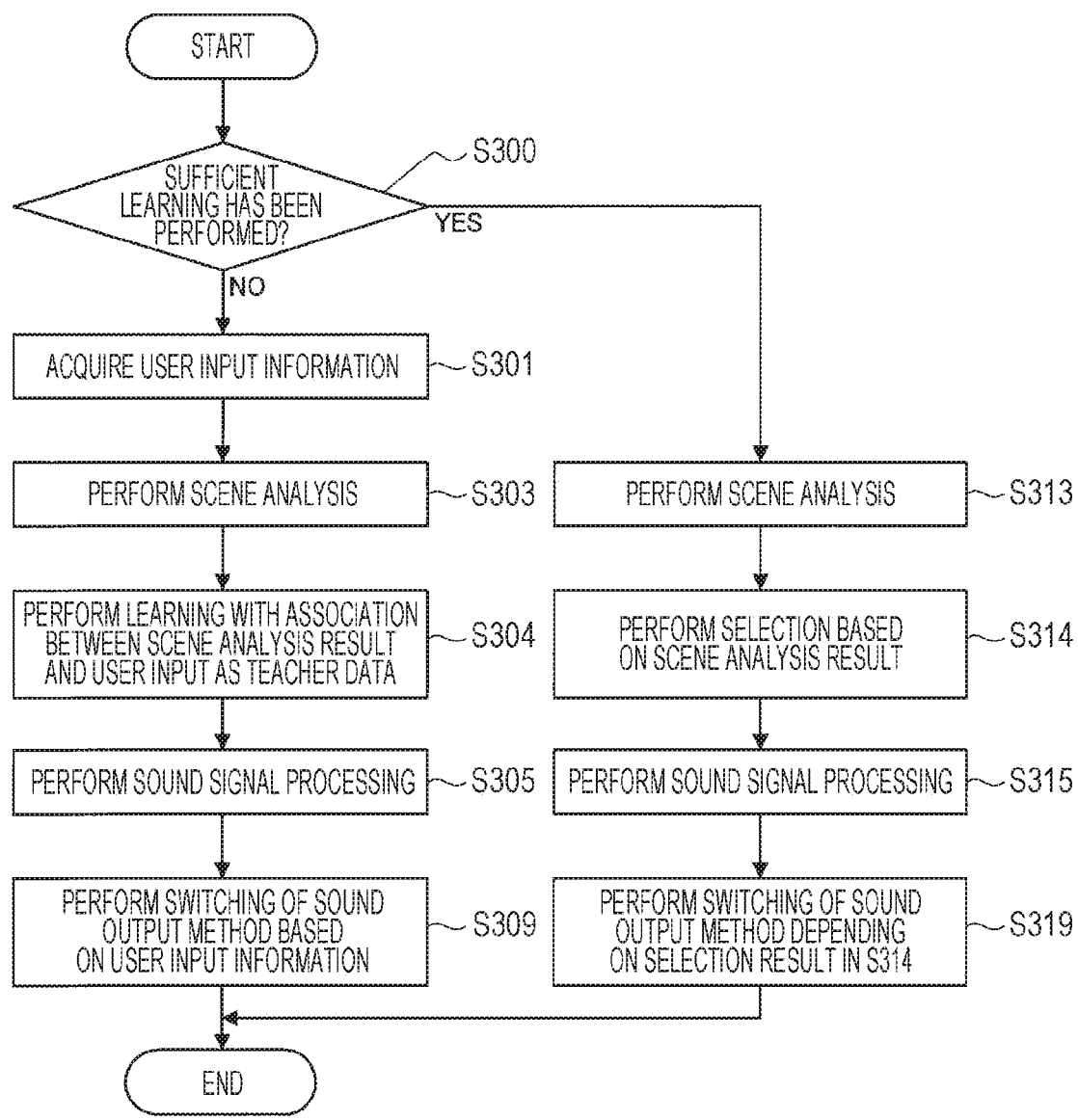
FIG. 9 is a flowchart illustrating an operation example of the sound output control unit 14-3 according to the embodiment.

In the above, a configuration example has been described of the sound output control unit 14-3 according to the present embodiment. Subsequently, an operation example according to the present embodiment will be described. FIG. 9 is a flowchart illustrating an operation example of the sound output control unit 14-3 according to the present embodiment.

As illustrated in FIG. 9, first, it is determined whether or not sufficient learning has been performed (S300). In a case where it is determined that sufficient learning has not been performed (NO in S300), user input information is acquired (S301).

Subsequently, the scene analysis unit 143 performs scene analysis on the basis of the input image signal, the input sound signal, and the reproduction speed information (S303). Moreover, the scene analysis unit 143 performs learning with the data in which the result of the scene analysis and the user input information are associated with each other, as teacher data (correct answer data) (S304).

Furthermore, the sound processing unit 144 performs sound signal processing on the input sound signal (S305). Subsequently, the switching unit 149 performs switching control of the sound output method on the basis of the user input information acquired in step S301 (S309).

On the other hand, in a case where it is determined that sufficient learning has already been performed (YES in S300), the scene analysis unit 143 performs scene analysis on the basis of the input image signal, the input sound signal, and the reproduction speed information (S313). Moreover, the scene analysis unit 143 uses the discriminator obtained by learning to select an output sound method on the basis of the result of the scene analysis (S314).

Furthermore, the sound processing unit 144 performs sound signal processing on the input sound signal (S315). Subsequently, the switching unit 149 performs switching control of the output sound signal on the basis of the selection result in step S314 (S319). Note that, the processing of steps S301 to S319 described above may be repeated as appropriate.

(Effect)

In the above, the third embodiment of the present disclosure has been described. According to the present embodiment, the switching control is performed on the basis of the user input information, and the learning is performed by associating the result of the scene analysis with the user input information to obtain the discriminator. With such a configuration, the discriminator is obtained capable of discrimination with high accuracy. Furthermore, after sufficient learning is performed and the discriminator is obtained, the user's input operation becomes unnecessary, and the user's burden is reduced. Moreover, since the user's preference is reflected in the discriminator, it is possible to automatically select a sound output method that matches the user's preference.

3. Modifications

In the above, the embodiments of the present disclosure have been described. Hereinafter, some modifications will be described of the embodiments of the present disclosure. Note that, each modification described below may be applied to each embodiment of the present disclosure alone, or may be applied to each embodiment of the present disclosure in combination. Furthermore, each modification may be applied instead of the configuration described in each embodiment of the present disclosure, or may be additionally applied to the configuration described in each embodiment of the present disclosure.

3-1. Modification 1

In the above description, an example has been described in which the sound output control unit performs the switching control that selects one sound output method from the plurality of sound output methods and performs switching; however, the present technology is not limited to such an example. The control related to sound output by the sound output control unit may include mixing control that performs mixing of sound signals obtained by the plurality of sound output methods. Such an example will be described as Modification 1.

In the following, an example will be described in which a sound output control unit according to the present modification performs mixing of sound signals respectively obtained by the above-described sound output method using the time extension processing by the sample interpolation, sound output method using the time extension processing by inserting the silence time, and sound output method using the time extension processing of repeating the waveform. Note that, in the following, the sound signal obtained by the time extension processing by the sample interpolation is referred to as a first signal, the sound signal obtained by the time extension processing by inserting the silence time is referred to as a second signal, and the sound signal obtained by the time extension processing of repeating the waveform is referred to as a third signal.

For example, the sound output control unit according to the present modification may perform the mixing control so that scene analysis including human voice detection is performed and, in a case where a human voice is detected, a percentage of the mixing differs depending on a percentage of the human voice obtained by the human voice detection. For example, the sound output control unit according to the present modification may perform the mixing control so that a percentage of the first signal and a percentage of the second signal are increased and a percentage of the third signal is decreased as the percentage of the human voice is increased. This is because the time extension processing related to the first signal and the second signal is effective in a scene including the human voice as described above.

Furthermore, the sound output control unit according to the present modification may perform the mixing control so that, in a case where the percentage of the human voice is large, the percentage of the mixing differs depending on the ratio between the first frame rate and the second frame rate specified from the reproduction speed information. For example, the sound output control unit according to the present modification may perform the mixing control so that the percentage of the first signal is increased in a case where the ratio is small (the reproduction speed is small), and the percentage of the second signal is increased in a case where the ratio is large (the reproduction speed is large). This is because the pitch of the sound decreases depending on the reproduction speed in the time extension processing related to the first signal as described above, so that it is desirable that the percentage of the second signal is larger than that of the first signal in a case where the reproduction speed is large.

Note that, in a case where the percentage of the human voice is small, since the time extension processing related to the third signal may be more effective than the time extension processing related to the first signal and the time extension processing related to the second signal, the mixing control may be performed so that the percentage of the third signal is increased regardless of the ratio between the first frame rate and the second frame rate.

The mixing control performed by the sound output control unit according to the present modification described above may be performed by a processing block that receives sound signals obtained by the plurality of sound output methods, and such a processing block may output the output sound signal to the sound output unit instead of the switching unit described above. Furthermore, the sound processing unit described above may include the processing block that performs the mixing control described above, and a sound signal obtained by such a processing block may be output to the switching unit described above. In such a case, a sound output method by performing the mixing control can be selected as one of the plurality of sound output methods.

3-2. Modification 2

In the embodiments described above, an example has been described in which each processing block included in the sound processing unit performs processing separately (in parallel); however, the present technology is not limited to such an example. For example, the sound output control unit may perform control so that only the processing block related to a selected sound output method performs the processing. According to such a configuration, it is possible to suppress the amount of processing although a delay may occur because processing is switched instead of a signal at the time of switching.

4. Hardware Configuration Example

In the above, the embodiments of the present disclosure have been described. Finally, with reference to FIG. 10, a hardware configuration will be described of the information processing device according to the embodiments of the present disclosure. FIG. 10 is a block diagram illustrating an example of a hardware configuration of the information processing device according to the embodiments of the present disclosure. Note that, an information processing device 900 illustrated in FIG. 10 can implement, for example, the above-described information processing device 1 according to the first embodiment, information processing device according to the second embodiment, or information processing device according to the third embodiment. Information processing by the information processing device 1 according to the first embodiment, information processing device according to the second embodiment, or information processing device according to the third embodiment of the present disclosure is implemented by cooperation of software and hardware described below.

As illustrated in FIG. 10, the information processing device 900 includes a central processing unit (CPU) 901, a read only memory (ROM) 902, a random access memory (RAM) 903, and a host bus 904a. Furthermore, the information processing device 900 includes a bridge 904, an external bus 904b, an interface 905, an input device 906, an output device 907, a storage device 908, a drive 909, a connection port 911, a communication device 913, and a sensor 915. The information processing device 900 may include a processing circuit such as a DSP or an ASIC instead of or in addition to the CPU 901.

The CPU 901 functions as an arithmetic processing device and a control device, and controls overall operation within the information processing device 900 in accordance with various programs. Furthermore, the CPU 901 may be a microprocessor. The ROM 902 stores programs, calculation parameters, and the like to be used by the CPU 901. The RAM 903 temporarily stores programs to be used in execution of the CPU 901, parameters and the like that change in the execution. The CPU 901 can form the control unit 10, for example.

The CPU 901, the ROM 902, and the RAM 903 are connected to each other by the host bus 904a including a CPU bus and the like. The host bus 904a is connected to the external bus 904b such as a peripheral component interconnect/interface (PCI) bus via the bridge 904. Note that, the host bus 904a, the bridge 904, and the external bus 904b are not necessarily configured separately, and these functions may be mounted on one bus.

The input device 906 is implemented by a device to which information is input by the user, for example, a mouse, a keyboard, a touch panel, a button, a microphone, a switch, a lever, and the like. Furthermore, the input device 906 may be, for example, a remote control device using infrared rays or other radio waves, or an external connection device such as a mobile phone or a PDA adaptable to operation of the information processing device 900. Moreover, the input device 906 may include, for example, an input control circuit that generates an input signal on the basis of information input by the user using the input means described above and outputs the signal to the CPU 901, and the like. By operating the input device 906, the user of the information processing device 900 can input various data, and give an instruction to perform processing operation, to the information processing device 900.

The output device 907 includes a device that can visually or aurally notify the user of acquired information. Examples of such a device include: a display device such as a CRT display device, a liquid crystal display device, a plasma display device, an EL display device, or a lamp; an audio output device such as a speaker or a headphone; a printer device; and the like. The output device 907 outputs, for example, results obtained by various types of processing performed by the information processing device 900. Specifically, the display device visually displays the results obtained by the various types of processing performed by the information processing device 900 in various formats such as text, an image, a table, and a graph. On the other hand, the audio output device converts an audio signal including reproduced audio data, sound data, and the like into an analog signal to aurally output the signal. The output device 907 can form the display unit 70 and the sound output unit 90, for example.

The storage device 908 is a device for storing data formed as an example of a storage unit of the information processing device 900. The storage device 908 is implemented by, for example, a magnetic storage device such as an HDD, a semiconductor storage device, an optical storage device, a magneto-optical storage device, or the like. The storage device 908 may include a storage medium, a recording device that records data on the storage medium, a reading device that reads data from the storage medium, a deletion device that deletes data recorded on the storage medium, and the like. The storage device 908 stores various data and programs executed by the CPU 901, various data acquired from the outside, and the like. The storage device 908 described above can form the storage unit 50, for example.

The drive 909 is a reader/writer for the storage medium, and is incorporated in the information processing device 900 or externally attached thereto. The drive 909 reads information recorded on a removable storage medium such as a mounted magnetic disk, optical disk, magneto-optical disk, or semiconductor memory, and outputs the information to the RAM 903. Furthermore, the drive 909 can also write information on the removable storage medium.

The connection port 911 is an interface connected to an external device, and is a connection port with the external device capable of data transmission by, for example, a universal serial bus (USB) or the like.

The communication device 913 is, for example, a communication interface including a communication device and the like for connecting to a network 920. The communication device 913 is, for example, a communication card or the like for wired or wireless local area network (LAN), long term evolution (LTE), Bluetooth (registered trademark), or Wireless USB (WUSB). Furthermore, the communication device 913 may be a router for optical communication, a router for an asymmetric digital subscriber line (ADSL), a modem for various types of communication, or the like. For example, the communication device 913 can transmit and receive signals and the like according to a predetermined protocol, for example, TCP/IP or the like, with the Internet or another communication device.

The sensor 915 is any of various sensors, for example, an acceleration sensor, a gyro sensor, a geomagnetic sensor, an optical sensor, a sound sensor, a distance measurement sensor, a force sensor, and the like. The sensor 915 acquires information regarding a state of the information processing device 900 itself, such as posture or moving speed of the information processing device 900, and information regarding a surrounding environment of the information processing device 900, such as brightness and noise around the information processing device 900. Furthermore, the sensor 915 may also include a GPS sensor that receives GPS signals and measures latitude, longitude, and altitude of the device.

Note that, the network 920 is a wired or wireless transmission path for information transmitted from a device connected to the network 920. For example, the network 920 may include a public line network such as the Internet, a telephone line network, a satellite communication network, various local area networks (LANs) including Ethernet (registered trademark), a wide area network (WAN), and the like. Furthermore, the network 920 may include a dedicated line network such as Internet protocol-virtual private network (IP-VPN).

In the above, an example has been described of a hardware configuration capable of implementing functions of the information processing device 900 according to the embodiments of the present disclosure. Each of the components described above may be implemented using a generalpurpose member, or may be implemented by hardware specialized for the function of each component. Thus, it is possible to change the hardware configuration to be used as appropriate depending on the technical level of each implementation of the embodiments of the present disclosure.

Note that, a computer program for implementing each function of the information processing device 900 according to the embodiments of the present disclosure as described above can be produced and mounted on a PC or the like. Furthermore, it is also possible to provide a computer readable recording medium in which such a computer program is stored. The recording medium is, for example, a magnetic disk, an optical disk, a magneto-optical disk, a flash memory, or the like. Furthermore, the above computer program may be distributed via, for example, a network without using a recording medium.

5. Conclusion

As described above, according to the embodiments of the present disclosure, it is possible to output sound more flexibly in a case where display reproduction is performed at a frame rate lower than a frame rate at the time of imaging.

In the above, the preferred embodiments of the present disclosure have been described in detail with reference to the accompanying drawings; however, the technical scope of the present disclosure is not limited to such examples. It is obvious that persons having ordinary knowledge in the technical field of the present disclosure can conceive various modification examples or correction examples within the scope of the technical idea described in the claims, and it is understood that the modification examples or correction examples also belong to the technical scope of the present disclosure.

For example, each step in each operation according to the embodiments described above does not necessarily have to be processed in time series in the order described in the flowchart of FIG. 20. The steps in each operation may be processed in an order different from the order described in the flowchart, or may be processed in parallel.

Furthermore, the effects described in the present specification are merely illustrative or exemplary and not restrictive. That is, the technology according to the present disclosure can exhibit other effects obvious to those skilled in the art from the description of the present specification together with the above-described effects or in place of the above-described effects.

Note that, the following configurations also belong to the technical scope of the present disclosure.

(1)

An information processing device including a sound output control unit that performs control related to sound output, in a case where an image captured at a first frame rate is subjected to display reproduction at a second frame rate lower than the first frame rate, on the basis of at least one of an input image signal, an input sound signal, reproduction speed information indicating a ratio between the first frame rate and the second frame rate, or user input information, in which the control related to the sound output performed by the sound output control unit includes switching control that selects one sound output method from a plurality of sound output methods and performs switching, or mixing control that performs mixing of sound signals obtained by the plurality of sound output methods.

(2)

The information processing device according to (1), in which the sound output control unit includes a time extension processing unit that performs time extension processing of extending the input sound signal on the basis of the reproduction speed information, and the plurality of sound output methods includes a time extension method of outputting a time extension sound signal obtained by the time extension processing unit to a sound output unit.

(3)

The information processing device according to (2), in which the time extension processing unit separates a sound signal related to a harmonic sound and a sound signal related to a non-harmonic sound from each other on the basis of a harmonic structure, and performs different types of the time extension processing respectively for the sound signal related to the harmonic sound and the sound signal related to the non-harmonic sound.

(4)

The information processing device according to (3), in which the time extension processing unit separates an ambient noise signal related to ambient noise from the input sound signal, and performs the time extension processing on a noise reduction signal in which the ambient noise is reduced.

(5)

The information processing device according to (4), in which the time extension processing unit obtains the time extension sound signal by mixing the ambient noise signal or a sound signal obtained on the basis of the ambient noise signal with a sound signal on which the time extension processing is performed.

(6)

The information processing device according to any one of (2) to (5), in which the plurality of sound output methods includes a plurality of the time extension methods by a plurality of different types of the time extension processing.

(7)

The information processing device according to any one of (1) to (6), in which the sound output control unit performs scene analysis on the basis of at least one of the input image signal, the input sound signal, or the reproduction speed information, and on the basis of a result of the scene analysis, performs the switching control or the mixing control.

(8)

The information processing device according to (7), in which the scene analysis performed by the sound output control unit includes human voice detection that detects a human voice from the input sound signal.

(9)

The information processing device according to (8), in which the sound output control unit performs the mixing control to cause a percentage of the mixing to be different depending on a percentage of the human voice included in the input sound signal obtained by the human voice detection.

(10)

The information processing device according to any one of (7) to (9), in which the sound output control unit performs learning by associating the result of the scene analysis with the user input information.

(11)

The information processing device according to any one of (1) to (10), in which the sound output control unit performs the mixing control to cause a percentage of the mixing to be different depending on the ratio between the first frame rate and the second frame rate.

(12) The information processing device according to any one of (1) to (11), in which the plurality of sound output methods includes a method of outputting an effect sound signal obtained by performing predetermined effect processing on a sound signal based on the input sound signal to a sound output unit.

(13) The information processing device according to any one of (1) to (12), in which the plurality of sound output methods includes a method of outputting a sound signal prepared in advance to a sound output unit.

(14) A program causing a computer to implement a function of performing control related to sound output, in a case where an image captured at a first frame rate is subjected to display reproduction at a second frame rate lower than the first frame rate, on the basis of at least one of an input image signal, an input sound signal, reproduction speed information indicating a ratio between the first frame rate and the second frame rate, or user input information, in which
the control related to the sound output includes switching control that selects one sound output method from a plurality of sound output methods and performs switching, or mixing control that performs mixing of sound signals obtained by the plurality of sound output methods.

REFERENCE SIGNS LIST

1 Information processing device
10 Control unit
12 Display control unit
14 Sound output control unit
30 Operation unit
50 Storage unit
70 Display unit
90 Sound output unit

The invention claimed is:

1. An information processing device, comprising:
a sound output control unit configured to control sound output, when an image captured at a first frame rate is subjected to display reproduction at a second frame rate lower than the first frame rate, based on at least one of an input image signal, an input sound signal, reproduction speed information indicating a ratio between the first frame rate and the second frame rate, or user input information, wherein
the control of the sound output is based on at least one of a switching control or a mixing control,
the switching control
selects a sound output method from a plurality of sound output methods, and
performs a switching operation to the selected sound output method,
the mixing control performs a mixing operation of a plurality of sound signals obtained by the plurality of sound output methods,
the sound output control unit includes a time extension processing unit, and
the time extension processing unit is configured to:
execute a time extension process to extend the input sound signal based on the reproduction speed information to generate a time extension sound signal, wherein each of the plurality of sound output methods outputs the time extension sound signal to a sound output unit,
separate a sound signal associated with a harmonic sound and a sound signal associated with a non-harmonic sound from each other based on a harmonic structure, and
perform different types of the time extension process for the sound signal associated with the harmonic sound and the sound signal associated with the non-harmonic sound.

2. The information processing device according to claim 1, wherein the time extension processing unit is further configured to:
separate an ambient noise signal associated with ambient noise from the input sound signal, and
perform the time extension process on a noise reduction signal in which the ambient noise is reduced.

3. The information processing device according to claim 2, wherein
the time extension processing unit is further configured to obtain the time extension sound signal by a mixing operation of one of the ambient noise signal or a first sound signal with a second sound signal,
the first sound signal is obtained based on the ambient noise signal, and
the second sound signal is based on the time extension process.

4. The information processing device according to claim 1, wherein the plurality of sound output methods includes a plurality of the time extension methods by the different types of the time extension process.

5. The information processing device according to claim 1, wherein the sound output control unit is further configured to:
perform scene analysis based on at least one of the input image signal, the input sound signal, or the reproduction speed information, and
perform the switching control or the mixing control based on a result of the scene analysis.

6. The information processing device according to claim 5, wherein the scene analysis is based on a human voice detected from the input sound signal.

7. The information processing device according to claim 6, wherein the sound output control unit is further configured to perform the mixing control to vary a percentage of the mixing operation based on a percentage of the human voice included in the input sound signal.

8. The information processing device according to claim 5, wherein the sound output control unit is further configured to learn based on association of the result of the scene analysis with the user input information.

9. The information processing device according to claim 1, wherein the sound output control unit is further configured to perform the mixing control to cause a percentage of the mixing operation based on the ratio between the first frame rate and the second frame rate.

10. The information processing device according to claim 1, wherein the plurality of sound output methods includes a method to output an effect sound signal obtained by an effect process on a specific sound signal based on the input sound signal to the sound output unit.

11. The information processing device according to claim 1, wherein the plurality of sound output methods includes a method to output a specific sound signal to the sound output unit.

12. A non-transitory computer-readable medium having stored thereon computer-executable instructions which, when executed by a computer, cause the computer to execute operations, the operations comprising:

controlling sound output, when an image captured at a first frame rate is subjected to display reproduction at a second frame rate lower than the first frame rate, based on at least one of an input image signal, an input sound signal, reproduction speed information indicating a ratio between the first frame rate and the second frame rate, or user input information, wherein the control of the sound output is based on at least one of a switching control or a mixing control, the switching control
  selects a sound output method from a plurality of sound output methods, and
  performs a switching operation to the selected sound output method, and the mixing control performs a mixing operation of a plurality of sound signals obtained by the plurality of sound output methods;

executing a time extension process to extend the input sound signal based on the reproduction speed information to generate a time extension sound signal, wherein each of the plurality of sound output methods outputs the time extension sound signal to a sound output unit;

separating a sound signal associated with a harmonic sound and a sound signal associated with a non-harmonic sound from each other based on a harmonic structure; and performing different types of the time extension process for the sound signal associated with the harmonic sound and the sound signal associated with the non-harmonic sound.

13. An information processing device, comprising:

a sound output control unit configured to control sound output, when an image captured at a first frame rate is subjected to display reproduction at a second frame rate lower than the first frame rate, based on at least one of an input image signal, an input sound signal, reproduction speed information indicating a ratio between the first frame rate and the second frame rate, or user input information, wherein the control of the sound output is based on at least one of a switching control or a mixing control, the switching control
  selects a sound output method from a plurality of sound output methods, and
  performs a switching operation to the selected sound output method, the mixing control performs a mixing operation of a plurality of sound signals obtained by the plurality of sound output methods, and the mixing control causes a percentage of the mixing operation based on the ratio between the first frame rate and the second frame rate.

* * * * *